United States Patent [19]
Werson

[11] Patent Number: 5,986,376
[45] Date of Patent: Nov. 16, 1999

[54] BRUSHLESS DC MOTORS

[75] Inventor: Michael John Werson, Chandlers Ford, United Kingdom

[73] Assignee: Automotive Motion Technology Limited, Andover, United Kingdom

[21] Appl. No.: 08/875,220

[22] PCT Filed: Jan. 19, 1996

[86] PCT No.: PCT/GB96/00114

§ 371 Date: Jul. 18, 1997

§ 102(e) Date: Jul. 18, 1997

[87] PCT Pub. No.: WO96/22629

PCT Pub. Date: Jul. 25, 1996

[30] Foreign Application Priority Data

Jan. 20, 1995 [GB] United Kingdom .................... 9501154

[51] Int. Cl.[6] .............................. H02K 1/10; H02K 1/14; H02K 1/00
[52] U.S. Cl. ............................................ 310/186; 310/179
[58] Field of Search ..................................... 310/186, 179, 310/180

[56] References Cited

U.S. PATENT DOCUMENTS

| 5,418,416 | 5/1995 | Müller | 310/186 |
| 5,442,250 | 8/1995 | Stridsberg | 310/186 |

FOREIGN PATENT DOCUMENTS

| 0 160 868 A3 | 4/1985 | European Pat. Off. . |
| 0 433 479 A1 | 12/1989 | European Pat. Off. . |
| 0 484 525 A1 | 5/1990 | European Pat. Off. . |
| 35 46 226 A1 | 12/1985 | Germany . |
| 2 193 849 | 7/1987 | United Kingdom . |

*Primary Examiner*—Clayton LaBalle
*Attorney, Agent, or Firm*—Renner, Otto, Boisselle & Sklar, P.L.L.

[57] ABSTRACT

A brushless DC motor comprises a rotor (20) and a stator (22) having confronting surfaces. Permanent magnets (M) are provided at one of the confronting surfaces, the magnets being equally angularly spaced around an axis (A—A) of rotation of the rotor such that each magnet occupies part of a respective pole arc (PA) of a first circle (C1) centred on the axis (A—A), the pole arcs each subtending a common pole angle $\alpha$ to the axis. Teeth (Tm) are provided at the other of the confronting surfaces, the teeth being angularly spaced from one another around the axis (A—A) such that each tooth occupies part of a respective tooth arc (TA) of a second circle (C2) centred on the axis, the tooth arcs each subtending a common tooth angle $\beta$ to the axis. Windings (40) are wound around the teeth (Tm) whereby energisation of the windings with electrical currents at respective phases will produce a torque that will rotate the rotor (20). The tooth angle $\beta$ is substantially equal to the pole angle $\alpha$. The teeth (Tm) are arranged in an even number of sets, each set comprising at least one tooth (Tm). A respective further tooth (Ta) is disposed between each such set, each further tooth not having a winding thereon and each further tooth occupying part of a respective further arc of the second circle (C2), the further arcs each subtending to the axis (A—A) a common angle ($\gamma$) substantially equal to twice the above-mentioned pole angle ($\alpha$) divided by the number of phases.

16 Claims, 8 Drawing Sheets

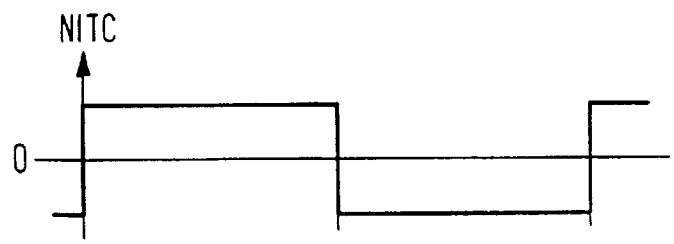
FIG. 3A
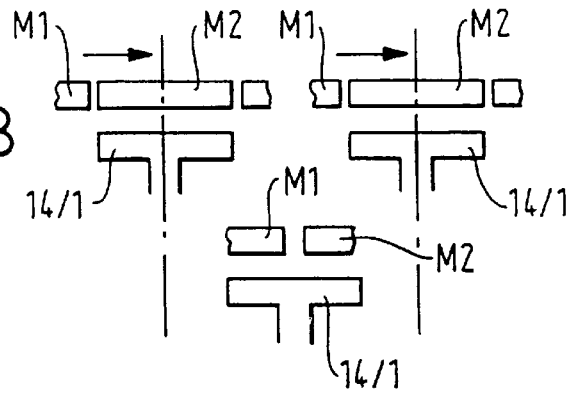
FIG. 3B
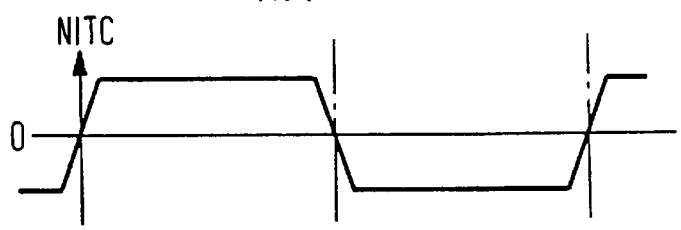
FIG. 3C
FIG. 4A
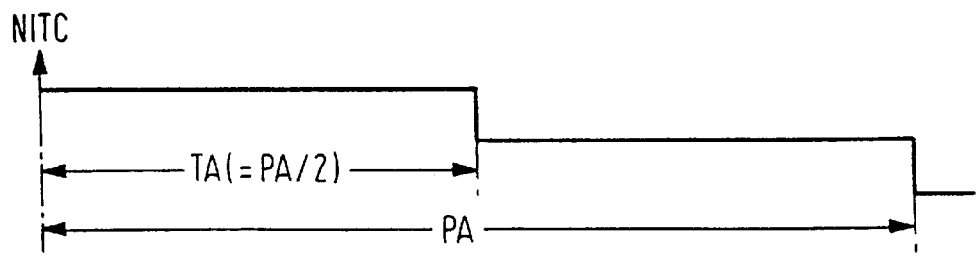
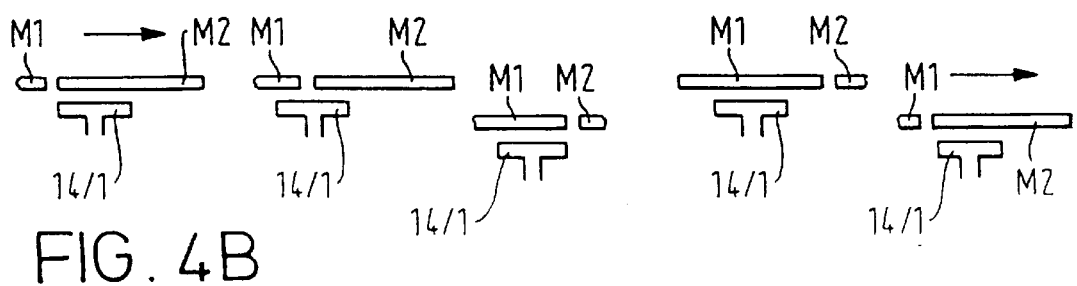
FIG. 4B FIG. 11
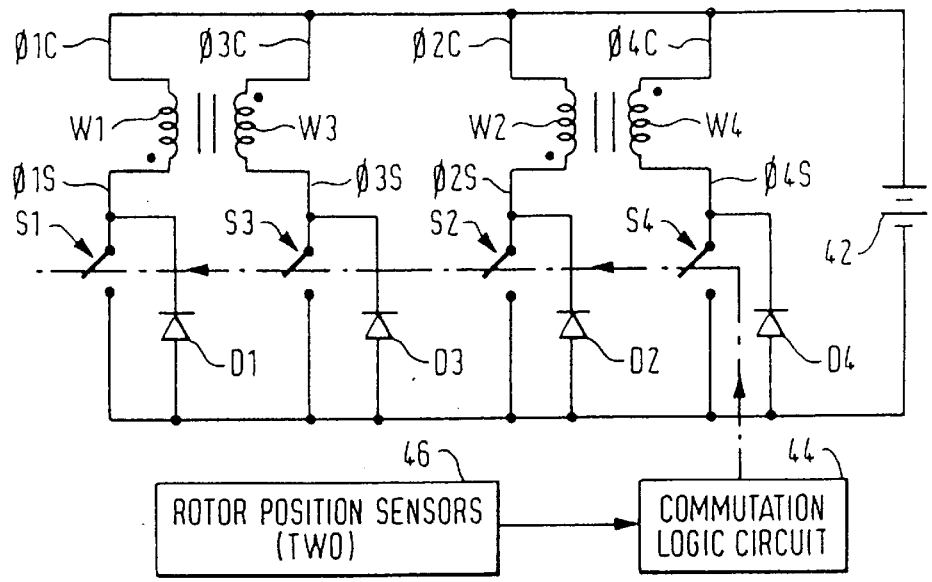
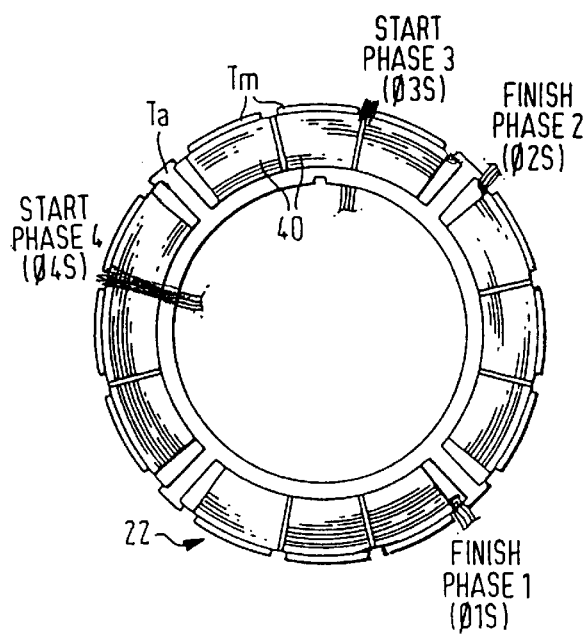
FIG. 13
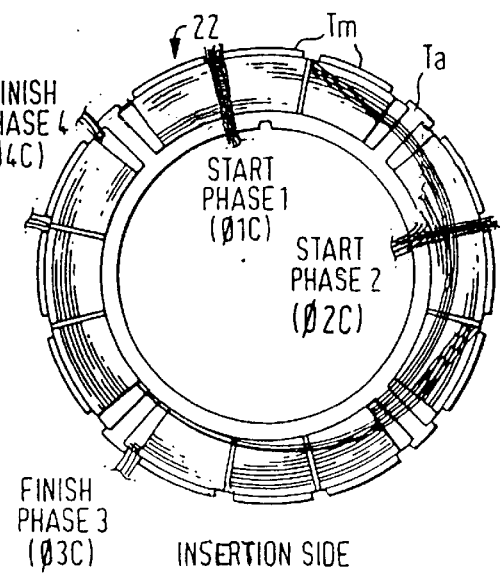
FIG. 12

FIG. 14A
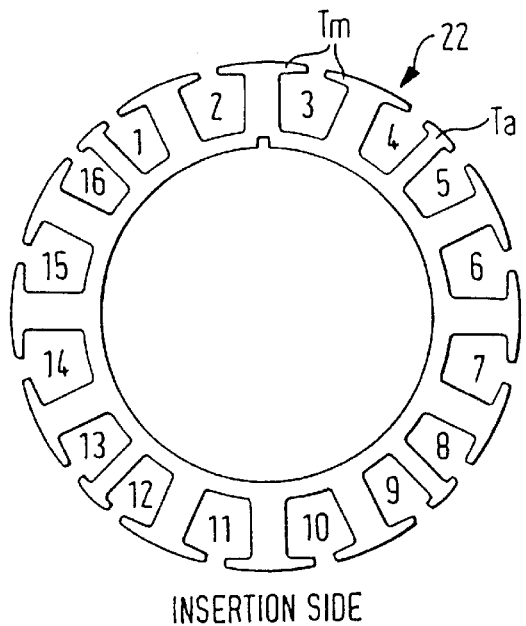
INSERTION SIDE
FIG. 14B
| PHASE 1.3 | |
|---|---|
| IN | OUT |
| 2 | 1 |
| 2 | 3 |
| 4 | 3 |
| 9 | 10 |
| 11' | 10 |
| 11 | 12 |
FIG. 14C
| PHASE 2.4 | |
|---|---|
| IN | OUT |
| 6 | 5 |
| 6 | 7 |
| 8 | 7 |
| 13 | 14 |
| 15 | 14 |
| 15 | 16 |
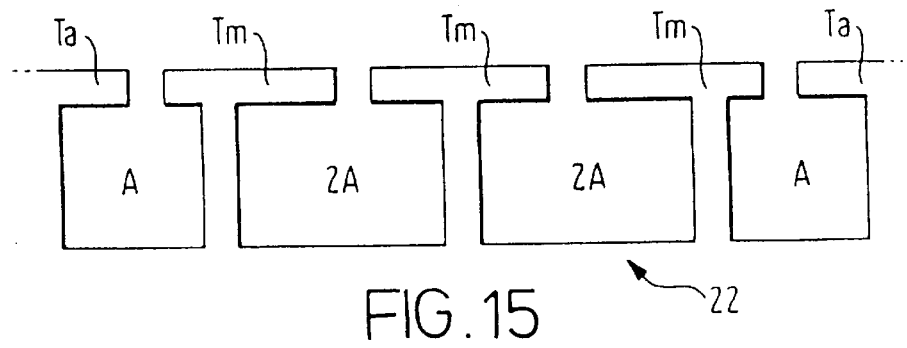
FIG. 15

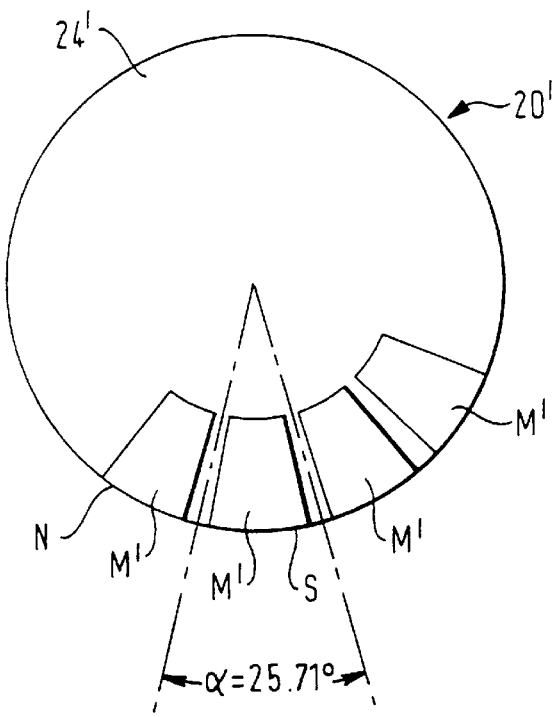
FIG. 16
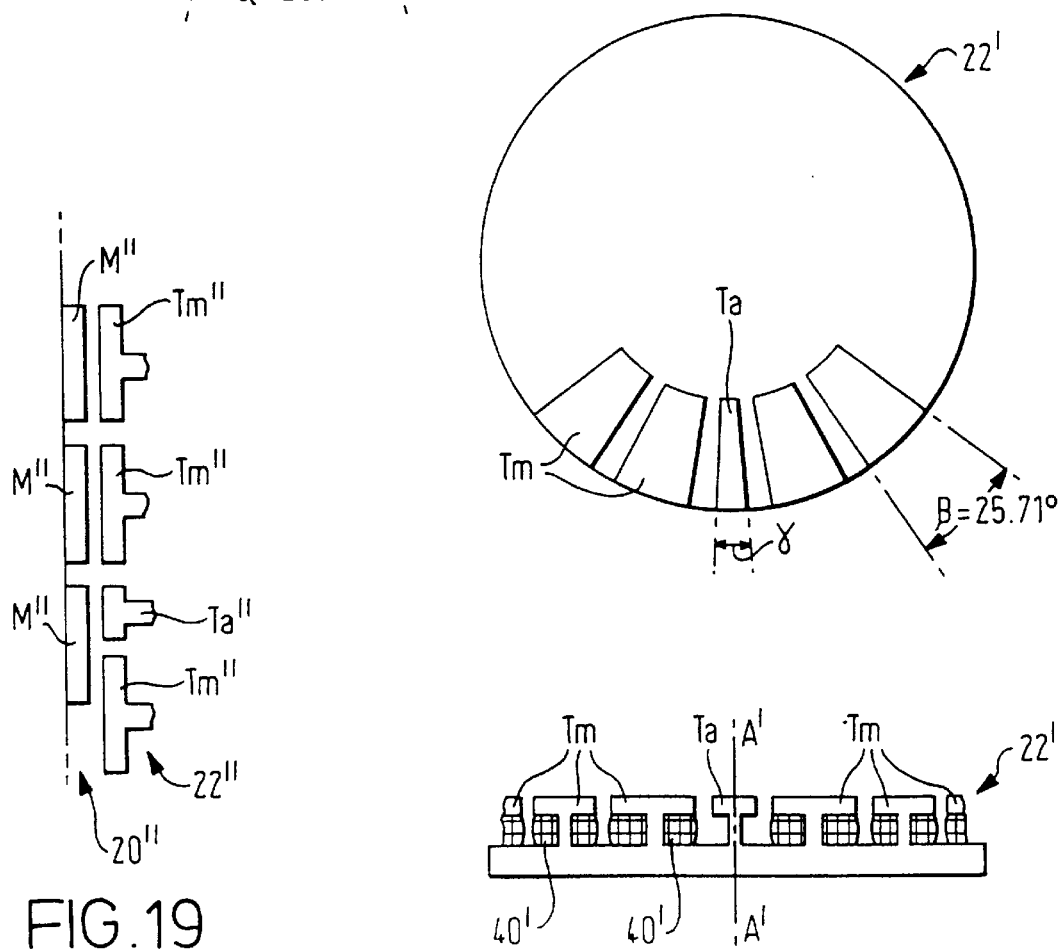
FIG. 17
FIG. 19
FIG. 18

BRUSHLESS DC MOTORS

This invention relates to brushless DC motors.

FIGS. 1 and 2 of the accompanying drawings show a known form of brushless DC motor. The brushless DC motor of FIGS. 1 and 2 comprises a cylindrical rotor 10 mounted for rotation about an axis A—A within a cylindrical stator 12 mounted so as to be coaxial with the rotor. The rotor 10 and stator 12 have confronting surfaces, namely the outer surface of the rotor and the inner surface of the stator, spaced apart by an air gap. Permanent magnets M in the form of bars are mounted on one of the above-mentioned confronting surfaces, namely the outer surface of the rotor 10. The magnets M (of which two only are shown in FIG. 1) are equally angularly spaced around the axis A—A of rotation of the rotor 10 such that each magnet occupies part of (and preferably substantially the whole of) a respective pole arc PA. Each pole arc PA is a respective arc of a first circle C1 (FIG. 2) of radius r1 which is centred upon the axis A—A and passes through the magnets M. Each pole arc PA subtends a common angle (pole angle) a to the axis A—A, whereby the pole arcs are equal to each other. (By virtue of the fact that FIG. 2 is a linear development, each pole arc PA appears in FIG. 2 as a rectilinear dimension rather than an arcuate dimension. Likewise, the surfaces of the magnets M facing the stator 12 appear flat rather than arcuate (convex).)

As can be seen by the reference signs N (North pole) and S (South pole) in FIG. 2, the magnets M are magnetised radially of the axis A—A with adjacent magnets being magnetised in opposite directions.

The stator 12 is of a ferromagnetic material and is formed in a manner known per se by a stack of like laminations (not shown) spaced apart along the axis A—A and secured to and electrically insulated from one another. By appropriate stamping of the laminations, teeth 14 are provided at the other of the above-mentioned confronting surfaces, namely the inner surface of the stator 12. The teeth 14 are equally angularly spaced from one another around the axis A—A of rotation of the rotor 10 such that each tooth occupies part of (and preferably substantially the whole of, subject to the constraint of leaving gaps to permit formation of the windings mentioned below) a respective tooth arc TA. Each tooth arc TA is a respective arc of a second circle C2 (FIG. 2) of radius r2 which is centred upon the axis A—A and passes through the teeth 14. Each tooth arc TA subtends a common angle (tooth angle) $\beta$ to the axis A—A, whereby the tooth arcs are equal to each other. (By virtue of the fact that FIG. 2 is a linear development, each tooth arc TA appears in FIG. 2 as a rectilinear dimension rather than an arcuate dimension. Likewise, the surfaces of the teeth 14 facing the rotor 10 appear flat rather than arcuate (concave).)

The teeth 14 are substantially T-shaped with the uprights of the Ts extending radially of the axis A—A of rotation of the rotor 10 and with the cross bars of the Ts facing the permanent magnets M across the air gap.

In general terms, brushless DC motors can employ either pitched winding or tooth winding. It will be assumed in the following that tooth winding (which has the potential advantage of better use of copper) is employed.

As shown in FIG. 2, a respective winding 16 is wound around the upright of the T of each of the teeth 14. Although not shown in FIG. 1, the teeth 14 extend axially along the whole axial length of the stator 12, whereby the windings 16 do likewise.

The windings 16 are electrically connected together in sets, where each set represents a phase of the motor. Each winding set may be formed by connecting together the windings 16 on a group of adjacent teeth 14. Alternatively, each winding set may be formed by connecting together the windings 16 on teeth 14 which are distributed around the stator 12 and spaced by teeth having windings belonging to another set or sets. The manner of connection of the windings 16 will be dependent on the number of magnets M, the number of phases and the number of teeth 14 per phase. For the sake of simplicity, the following description assumes (by way of example) that the windings 16 forming the winding set for each phase are on a group of adjacent teeth 14, and are wound in opposite directions on each adjacent tooth.

In use of the motor, the winding phase sets are energised, in synchronism with the relative angular position of the rotor 10 and stator 12, with electrical currents at respective phases, the currents flowing in opposite directions in adjacent windings. The currents flowing through the windings 16 interact with the magnetic fields produced by the magnets M to produce torque which rotates the rotor 10. In more detail, suppose that at a particular instant windings 16 designated 16/1 and 16/2 in FIG. 2 (which both belong to a particular one of the phases) are energised. Since the magnets designated M1 and M2 are oppositely poled, magnetic flux flows from the magnet M1 across the air gap, down through the tooth 14/1, through the body of the stator 12, up through the tooth 14/2 and back across the air gap to the magnet M2. This flux interacts with the currents in the windings 16/1 and 16/2 to produce torque components directed laterally in FIG. 2, i.e. tangentially of the rotor 10. Since the flux flows in opposite directions through the teeth 14/1 and 14/2 and since current flows in opposite directions through the windings 16/1 and 16/2, the torque components act in the same direction and the motor rotates.

The torque generated at any instant, by each phase, is proportional to the product of the number of turns of each energised winding 16, the energising current, and the rate of change of flux through the windings. The rate of change of flux defines a torque characteristic representing how the instantaneous torque generated by each phase varies with the angular position of the motor. This characteristic will be referred to hereinafter as the Normalised Instantaneous Torque Constant ("NITC"). The NITC, which is critical to the torque development of the motor, is dependent on the geometry of the magnets M and teeth 14. More particularly, the relationship between the pole arc PA and the tooth arc TA is significant.

In principle, the pole arc PA may be equal to the tooth arc TA. (More exactly, the pole angle $\alpha$ may be equal to the tooth angle $\beta$, which will involve a slight difference between the pole arc PA and the tooth arc TA due to the difference between the radii r1 and r2. However, since the difference between the radii r1 and r2 will be small, it is a good approximation in practical terms to refer to the pole arc PA being equal to the tooth arc TA.)

Equality between the pole arc PA and the tooth arc TA leads to an advantage. This is that the maximum average torque will be generated when PA=TA. Under this condition, the rate of change of flux in a tooth 14 (assuming the tooth to be non-saturating) will be ideally constant whilst an interface (junction) between two adjacent magnets (poles) moves across the tooth. Thus, the (ideal) NITC in this case will be as represented in FIG. 3A, which shows how the NITC varies as the interface between the magnets M1 and M2 moves across the tooth 14/1 as the motor rotates. (In order that FIG. 3A may be more readily comprehended, three relative positions of the M1/M2 interface and the tooth 14/1, corresponding to three respective positions of the NITC of FIG. 3A, are shown in FIG. 3B.) Since, in practice, a slot is required between adjacent teeth 14, the flux change between adjacent poles is not (as represented in FIG. 3A) instantaneous, but occupies a small angle. Therefore, in practice, the NITC is as shown in FIG. 3C.

Because the angular position of the magnet interface relative to the centre of a tooth 14 is (when PA=TA) the same for all the teeth 14, then the NITC for each tooth will be either in phase or in anti-phase with another, depending upon the winding directions of each winding phase set. Thus, when PA=TA, the motor can only be configured for single phase or two phase operation. However, there are only a limited number of applications where single phase or two phase motors can be used. In practice, 3, 4 or more phases must be realized for most applications. Thus, in summary, while equality between the pole arc PA and the tooth arc TA leads to an advantage as regards the generation of torque, it leads to the disadvantage that it is of limited application since it can be employed only in single phase or two phase motors.

With a motor employing so-called chorded winding, i.e. a motor in which one winding is wound around several teeth (or respective windings on respective teeth are interconnected), the phase teeth are distributed under each pole (magnet) to ensure the correct phase relationship between the phases. For a tooth wound motor, this is not an acceptable solution because the NITC is zero for considerable parts of the pole angle. Thus, the standard approach heretofore is to make the number of magnets (poles) different to the number of teeth in accordance with known (published) ratios that are different for three or four phase motors. Since the number of magnets differs from the number of teeth, it follows that the pole arc differs from the tooth arc. Accordingly, there are portions of the NITC period where a magnet interface is not moving across a tooth, resulting in no change in the flux in the tooth and therefore a zero level of NITC, i.e. zero torque.

For instance, consider the case of a four phase motor with standard numbers of poles (magnets) and teeth equal to two and four respectively. As the magnet interface M1/M2 moves across the tooth 14/1, an (ideal) NITC as shown in FIG. 4A is produced. (In order that FIG. 4A may be more readily comprehended, different relative positions of the M1/M2 interface and the tooth 14/1, corresponding to respective portions of the NITC of FIG. 4A, are shown in FIG. 4B.) Each phase is wound around a single tooth/pole and the resultant NITC indicates that torque is produced for only half its period. Similar results are obtained for motors having three phases or higher. Some improvement in the NITC profile can be achieved with higher pole and teeth numbers, but none can achieve the optimum torque characteristic of the case in which the pole arc PA is equal to the tooth arc TA.

According to the invention there is provided a brushless DC motor comprising:
a movable element and a stator having confronting surfaces, the movable element being movable relative to the stator along a predetermined path;
a plurality of permanent magnets provided at one of said confronting surfaces, the magnets being equally spaced along said path such that each said magnet occupies part of a respective section (pole section) of said path, said pole sections being equal to one another;
a plurality of teeth provided at the other of said confronting surfaces, said teeth being spaced from one another along said path such that each said tooth occupies part of a respective section (tooth section) of said path, said tooth sections being equal to one another; and
windings wound around said teeth whereby energisation of the windings with electrical currents at respective phases will produce a torque that will move the movable element;
characterized in that:
said tooth sections are substantially equal to said pole sections;
said teeth are arranged in an even number of sets, each set comprising at least one said tooth; and
the sets of tooth sections occupied by said sets of teeth are spaced apart by an extent, measured along said path, substantially equal to twice said pole section divided by the number of phases.

According to a particularly preferred form of implementation of the invention disclosed hereinbelow, the motor of the invention is embodied, like that described above with reference to FIGS. 1 and 2, as a radial type rotary movable element. In that case, the movor is a rotor, one of the rotor and stator is generally cylindrical and nested within the other, said magnets and said teeth are both elongate and extend parallel to an axis of rotation of the rotor, and said path is defined by a circle which is centred on the axis of rotation and located in a cylindrical air gap between the rotor and the stator. Thus, in this case, the pole and tooth sections of the path are, respectively, the pole arc and the tooth arc.

Such a motor construction leads to the following advantageous effect. Since the tooth angle (and therefore the tooth arc of the wound teeth) is substantially the same as the pole angle, it is possible to achieve an NITC which is substantially as good as the superior NITC provided by the above-described known arrangement in which the tooth angle is equal to the pole angle. However, since the tooth sets are separated by a common angle substantially equal to twice the pole angle divided by the number of phases, there is an angular displacement (for any given angular position of the motor) between the angular relationship of a magnet interface and a tooth in one tooth set and the same relationship in another tooth set. That is, in contrast to the known arrangement, it is no longer true that the angular position of a magnet interface relative to a tooth is the same for all the teeth. Thus, it is no longer true that the NITC for each tooth is either in phase or in anti-phase with that for each other tooth; and therefore no longer true that the motor can be implemented only as a single phase or two phase motor. On the contrary, the motor can readily be implemented so as to have three, four or even more phases. Thus, the advantage (as regards the torque characteristic) of the equal angle arrangement is achieved, without the attendant disadvantage of limitation to one or two phase implementation only.

The separations between the tooth sets can lead to the generation of detent torque. To minimise detent torque, it is possible (and preferred) for a respective further tooth, not having a winding thereon, to be disposed in each space between said sets of tooth sections occupied by said sets of teeth. The further (non-wound) teeth serve to preserve magnetic continuity in the parts of said other of said confronting surfaces between the wound tooth sets, thereby minimising detent torque.

With appropriate design of the teeth, the provision of the further (non-wound) teeth need not give rise to a loss in efficiency because—as explained hereinbelow—the space around the teeth can be used to accommodate the windings of the wound teeth.

Preferably, there are four said sets of teeth and the motor is a four phase motor. A four phase motor can provide more efficient use of silicon (in circuitry for energising the windings) than the three phase construction usually employed in DC brushless motors, while still allowing the energising current to be controlled in a pulse width modulated manner.

The particularly preferred form of implementation of the invention as an axial type rotary motor may be embodied in a variety of manners. In a particularly preferred embodiment disclosed in detail hereinbelow: the plurality of permanent magnets is provided at said confronting surface of the rotor and the teeth are provided at said confronting surface of the stator; the rotor is arranged outside of the stator; the rotor comprises a cylindrical body having the permanent magnets mounted to the inside thereof; and both said teeth having said windings thereon and said further teeth are substantially T-shaped with the uprights of the Ts extending radially of the axis of rotation of the rotor and with the cross bars of the Ts facing the permanent magnets.

As explained hereinbelow, the invention is not limited to implementation as a radial type rotary motor. It may, for example, also be implemented as an axial type rotary motor and as a linear motor.

The invention will now be further described, by way of illustrative and non-limiting example, with reference to the accompanying drawings, in which like reference signs designate like items throughout, and in which:

FIG. 3A shows an ideal Normalised Instantaneous Torque Constant (NITC) of the known motor in the case where a pole arc and a tooth arc thereof are equal to each other;

FIG. 3B shows relative positions of a magnet interface and a tooth corresponding to respective positions of the NITC shown in FIG. 3A;

FIG. 3C shows the practical form of the ideal NITC shown in FIG. 3A;

FIG. 4A shows an ideal NITC of a four phase version of the known motor in which the pole arc and tooth arc are different from each other;

FIG. 4B shows relative positions of a magnet interface and a tooth corresponding to respective positions of the NITC shown in FIG. 4A;

FIG. 11 shows a modification of the circuit of FIG. 9 for use with a modification (embodying the invention) of the motor of FIGS. 5 to 8 in which the windings for each phase are distributed among the teeth of pairs of alternate sets of main teeth of the stator;

FIG. 12 shows, from an insertion side thereof, the stator of the modified motor;

FIG. 13 shows the stator of the modified motor from the side opposite to the insertion side;

FIG. 14A shows the stator of the modified motor from the insertion side, prior to windings being wound around the teeth thereof;

FIGS. 14B and 14C are tables that show, in conjunction with FIG. 14A, how the windings are made;

FIG. 15 is a schematic view of a linear development of part of the stator of another modification (embodying the invention) of the motor of FIGS. 5 to 8;

FIG. 16 is a view from an air gap face of a rotor of an axial type rotary four phase brushless DC motor embodying the invention;

FIG. 17 is a view from an air gap face of a stator of the motor of FIG. 16;

FIG. 18 is an edge view of the stator of FIG. 17; and

FIG. 19 is a partial and somewhat schematic view of a linear four phase brushless DC motor embodying the invention.

A four phase brushless DC motor embodying the invention will now be described with reference to FIGS. 5 to 8. The brushless DC motor of FIGS. 5 to 8 resembles in many respects that of FIGS. 1 and 2, so the description of the motor of FIGS. 5 to 8 will be limited to some extent to the respects in which it differs from that of FIGS. 1 and 2.

The brushless DC motor of FIGS. 5 to 8 comprises a cylindrical rotor 20 mounted for rotation about an axis A—A and, nested within the rotor, a cylindrical stator 22 mounted so as to be coaxial with the rotor. The rotor 20 and stator 22 have confronting surfaces, namely the inner surface of the rotor and the outer surface of the stator, spaced apart by a cylindrical air gap.

Figure 5:
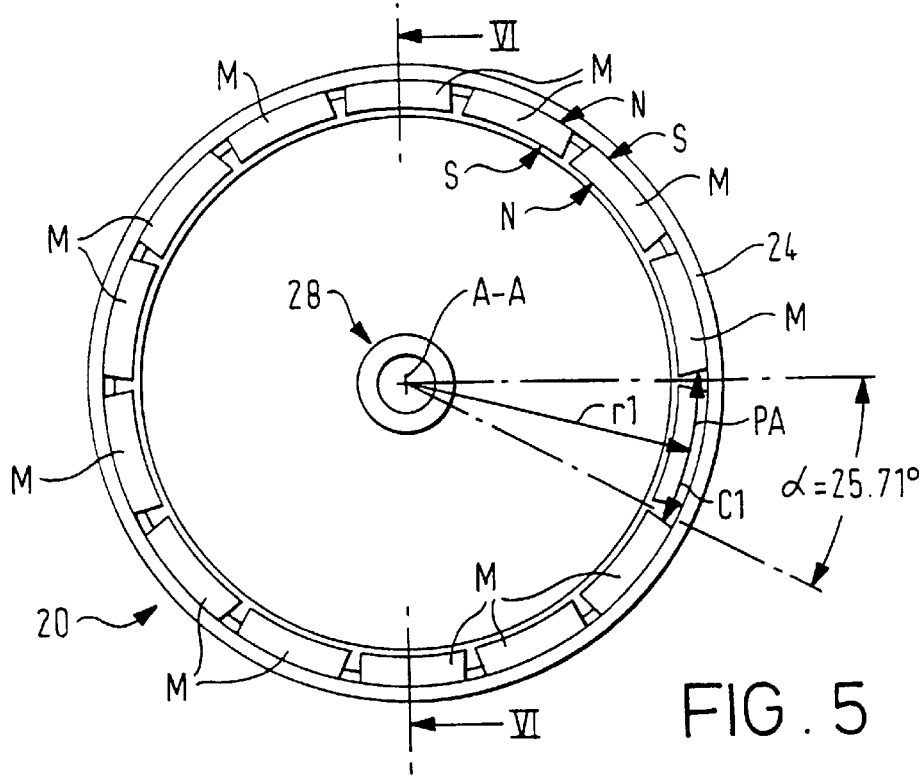
FIG. 5 is an end view of a rotor of a radial type rotary four phase brushless DC motor embodying the invention.
Figure 6:
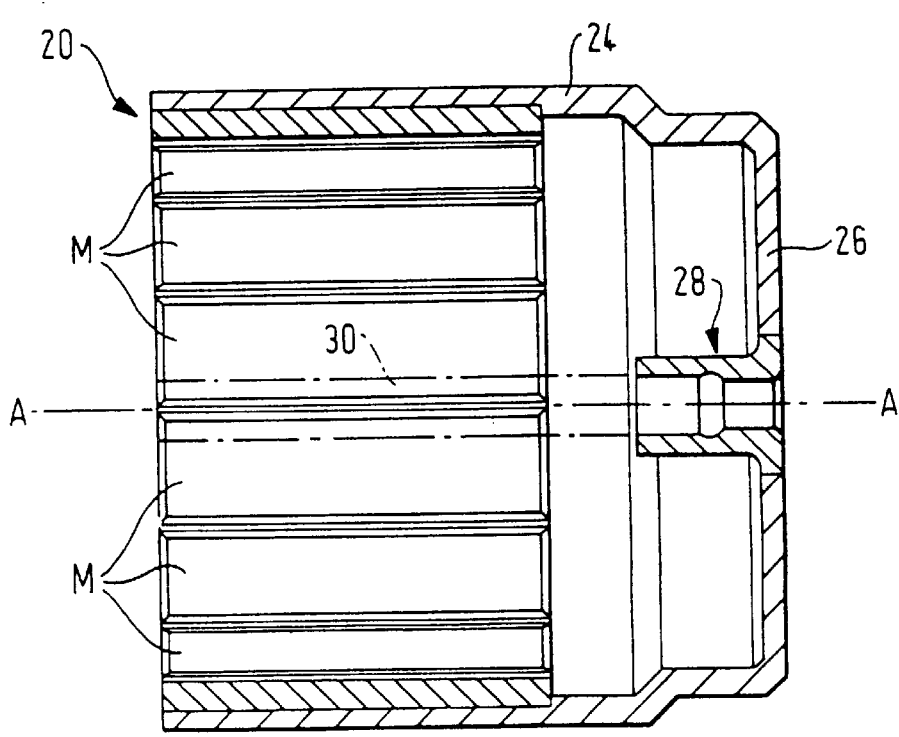
FIG. 6 is a cross-sectional view, taken along a line VI—VI in FIG. 5, of the rotor of the motor embodying the invention.

The rotor 20 comprises a cylindrical mild steel body 24 having one closed end 26 (FIG. 6). The rotor 20 also comprises permanent magnets M, in the form of elongate members such as bars, adhesively secured to the inner surface of the cylindrical body 24, which inner surface forms one of the above-mentioned confronting surfaces. The magnets M (of which there are fourteen in the present embodiment) are equally angularly spaced around the axis A—A of rotation of the rotor 20 such that each magnet occupies part of (and preferably substantially the whole of) a respective pole arc PA. Each pole arc PA is a respective arc of a first circle C1 (FIG. 5) of radius r1 which is centred upon the axis A—A and passes through the magnets M. Each pole arc PA subtends a common angle (pole angle) α to the axis A—A, whereby the pole arcs are equal to each other. Since, in the present embodiment, there are fourteen magnets M, the pole angle α is equal to (360°/14)=25.71°.

As can be seen by the reference signs N (North pole) and S (South pole) in FIG. 5, the magnets M are magnetised radially of the axis A—A with adjacent magnets being magnetised in opposite directions.

The closed end 26 of the cylindrical body 24 of the rotor 20 has a socket 28 formed therein. The end of the socket 28 inside the cylindrical body 24 receives a spindle 30 shown in phantom in FIG. 6 (see also FIG. 8) by means of which the rotor 20 is journalled for rotation when the motor is assembled. The end of the socket 28 outside the cylindrical body 24 receives an output shaft (not shown) which extends outside of an outer casing (not shown) of the motor.

Figure 7:
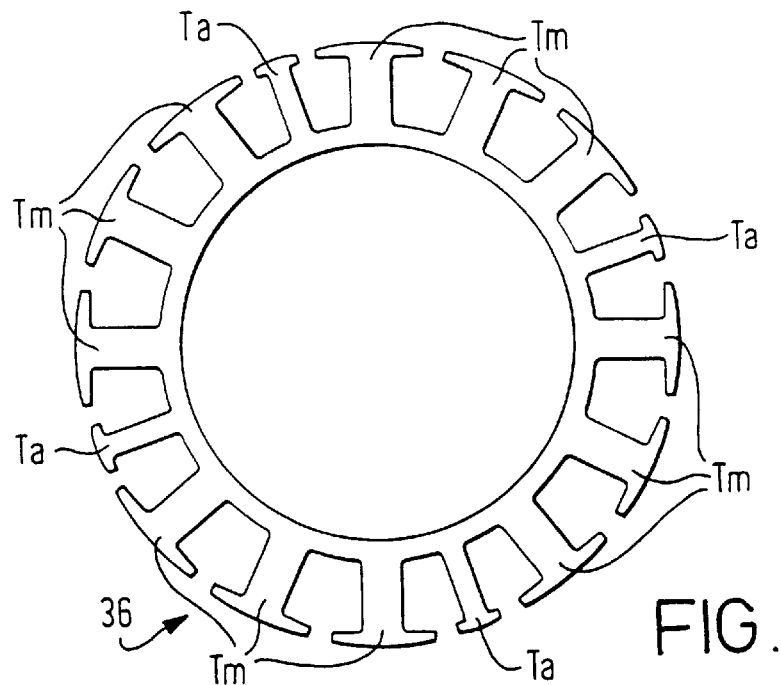
FIG. 7 shows a lamination of a stator of the motor embodying the invention.

The stator 22 comprises a former 32 having therein a bore 34 which, when the motor is assembled, receives the spindle 30 of the rotor 20. Mounted to the outside of the former 32 is a body of ferromagnetic material which is formed in a manner known per se by a stack of like laminations 36 (one of which is shown in FIG. 7)) spaced apart along the axis A—A (when the motor is assembled) and secured to and electrically insulated from one another. By appropriate forming (e.g. stamping) of the laminations 36, sixteen teeth Tm, Ta are provided at the other of the above-mentioned confronting surfaces, namely the outer surface of the stator 22.

The teeth Tm, Ta consist of twelve main teeth Tm and four auxiliary teeth Ta. As can be seen from FIGS. 7 and 8, the teeth Tm, Ta are angularly spaced from one another around the axis A—A of rotation of the rotor 20 (when the motor is assembled) such that the main teeth Tm are arranged into four sets of three adjacent teeth and a respective auxiliary tooth Ta is arranged between each such set of three main teeth Tm.

Each main tooth Tm occupies part of (and preferably substantially the whole of, subject to the constraint of leaving gaps to permit formation of the windings mentioned below) a respective tooth arc TA. Each tooth arc TA is a respective arc of a second circle C2 (FIG. 8) of radius r2 which is centred upon the axis A—A and passes through the teeth Tm (and the teeth Ta). Each tooth arc TA subtends a common angle (tooth angle) $\beta$ to the axis A—A, whereby the tooth arcs TA are equal to each other. The motor is so constructed that the tooth angle $\beta$ for the main teeth Tm is equal to the pole angle $\alpha$ for the magnets M, namely (360°/14)=25.71°. Accordingly, the tooth arc TA for the main teeth Tm is substantially equal to the pole arc PA for the magnets M.

Each auxiliary tooth Ta occupies part of (and preferably substantially the whole of, subject to the constraint of leaving gaps to permit formation of the windings mentioned below) a respective tooth arc TAa. Each tooth arc TAa is a respective further arc of the second circle C2. Each tooth arc TAa subtends a common angle (tooth angle) $\gamma$ to the axis A—A, whereby the tooth arcs TAa are equal to each other. The motor is so constructed that the tooth angle $\gamma$ for the auxiliary teeth Ta is substantially equal to the half the tooth angle $\beta$ for the main teeth Tm, which it will be recalled is substantially equal to the pole angle $\alpha$ for the magnets M, namely (360°/14)=25.71°. That is, the tooth angle $\gamma$ for the auxiliary teeth Ta is equal to (360°/14)=12.28°.

Both the main teeth Tm and the auxiliary teeth Ta are substantially T-shaped with the uprights of the Ts extending radially of the axis A—A of rotation of the rotor 20 and with the cross bars of the Ts facing the permanent magnets M across the air gap.

Figure 8:
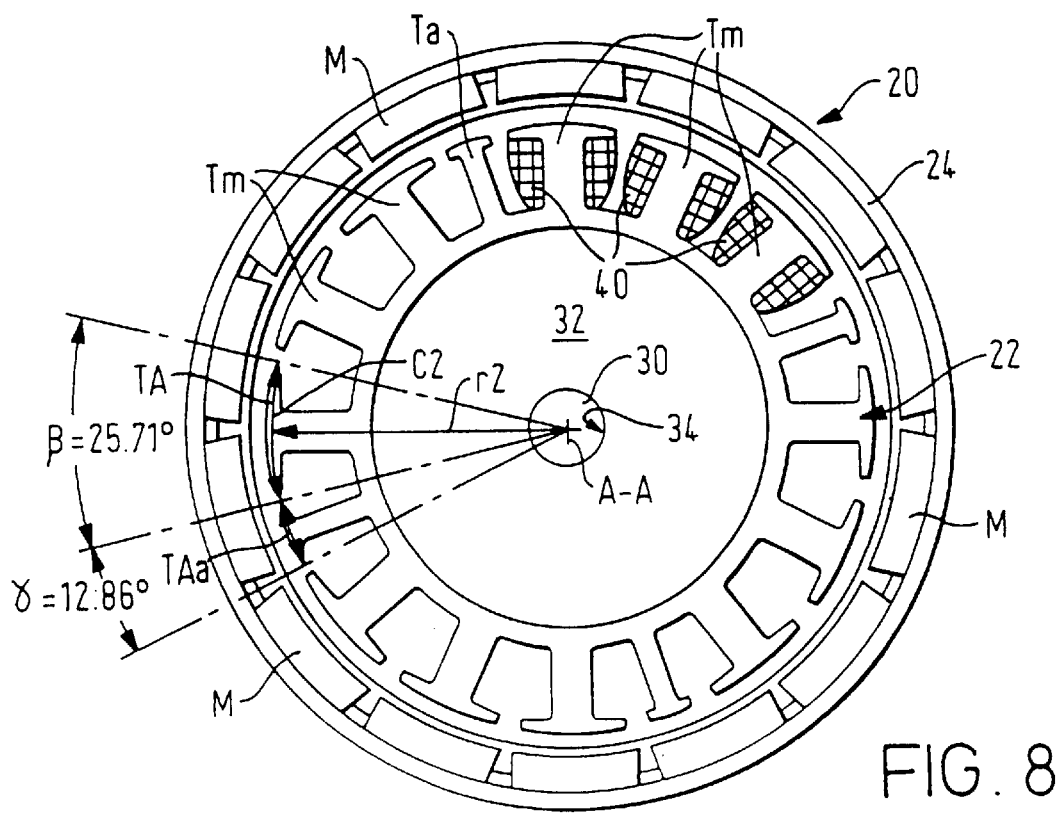
FIG. 8 is an end view, corresponding to FIG. 5, of the stator of the motor embodying the invention when mounted within the rotor.

As shown in FIG. 8 for a first set only of the main teeth Tm, a respective winding 40 is wound around the upright of the T of each of the twelve main teeth Tm. (However, it is important to note, windings are not wound around the auxiliary teeth Ta.) Although not shown in the drawings, the main teeth Tm (and also the auxiliary teeth Ta) are elongate and extend axially along the whole axial length of the stator 22, whereby the windings 40 do likewise. The axial length of the stator 22 is in fact substantially equal to the axial length of the permanent magnets M of the rotor 20, whereby, when the stator is assembled into the rotor, the opposite ends of the stator are aligned with the opposite ends of the magnets. Circuitry (described hereinbelow) for energising the windings 40 with electrical current can be fastened to the end of the stator 22 which, when the motor is assembled, is nearer the closed end (see FIG. 6) of the cylindrical body 24 of the rotor 20, to occupy the space inside the body 24 between the stator and the closed end 26.

In use of the motor, the windings 40 are energised, in synchronism with the relative angular position of the rotor 20 and stator 22, with electrical currents that interact with the magnetic fields produced by the magnets M to produce torque which rotates the rotor 20. The manner of energisation will now be described in more detail.

As indicated above, the motor of the present embodiment is a four phase motor. This is why there are four sets of three main teeth Tm having windings 40 thereon. For simplicity, it will be assumed for the present that the windings 40 of each respective one of the four sets of main teeth Tm are those of a respective one of the four phases. However, as explained below, this is not necessarily the case: the windings 40 of each phase may be distributed among the respective sets of main teeth Tm.

The four respective sets of three windings 40 on the four sets of three main teeth Tm are energised during respective ones of the four phases. That is, during a respective phase, the three windings 40 on a respective one of the four main tooth sets are energised at the same time (and such that the current flow in adjacent ones of the three windings is in opposite directions). To this end, the three windings 40 of each main tooth set (each phase) are interconnected in series. (Alternatively, they could be interconnected in parallel or in series/parallel; or there could be a single winding wound around all three main teeth.)

Figure 9:
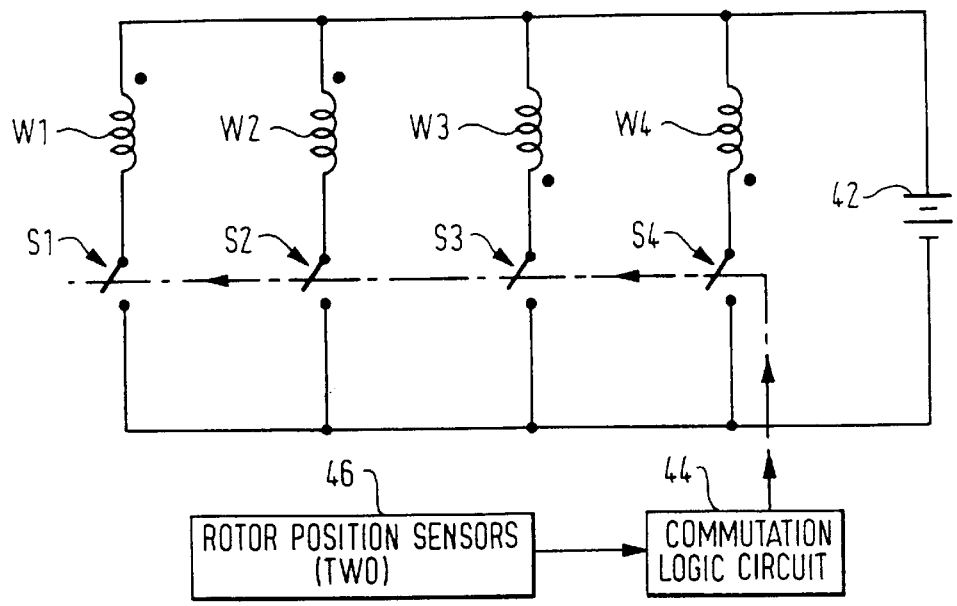
FIG. 9 is a schematic circuit diagram of one form of switching or drive circuit that can be used for energising the windings of the motor embodying the invention.

FIG. 9 is a schematic circuit diagram of one form of switching circuit that can be used for energising the windings 40. In FIG. 9, the item shown as a single coil W1 is in fact a winding assembly (for phase 1) consisting of the series connection of those three windings 40 that are illustrates in FIG. 8, namely those wound on the first set of three main teeth Tm. The item shown as a single coil W2 is in fact a winding assembly (for phase 2) consisting of the series connection of the three windings (not shown in FIG. 8) on a second of the four sets of three main teeth Tm, namely that set which, in (say) the clockwise direction in FIG. 8, follows the first set. Likewise, the items shown as single coils W3 and W4 are in fact winding assemblies (for phases 3 and 4, respectively) consisting of the series connections of three windings (not shown in FIG. 8) on third and fourth of the four sets of three main teeth Tm, namely those sets which, in the clockwise direction in FIG. 8, follow in turn the second set.

Each of the winding assemblies W1 to W4 for the respective phases 1 to 4 is connected across a DC voltage supply 42 in series with a respective switch S1 to S4 (for example a semiconductor switch such as a power FET). The operation of the switches S1 to S4 is controlled by a commutation logic circuit 44, whose state is set by rotor position sensors (for example Hall effect sensors, two in the case of a four phase motor) 46, such that, during each revolution of the motor, starting from a predetermined relative angular position of the rotor 20 and stator 22, one only of the switches is closed in turn, in the order S1, S2, S3 and S4, for a respective 25% of the revolution (cycle), i.e. for a respective one of the four phases in turn. As a consequence, the winding assemblies W1 to W4 are energised in turn, in the order W1, W2, W3 and W4, for a respective 25% of the revolution (cycle), i.e. for a respective one of the four phases in turn. Bearing in mind that, as indicated in FIG. 9 in the conventional manner by the dots adjacent the winding assemblies W1 to W4, the winding assemblies W3 and W4 are energised in the opposite sense to the winding assemblies W1 and W2, and considering the showing of FIG. 8 in the light of the foregoing description, it will be apparent to one skilled in the art that correct four phase energisation of the motor will be achieved. (FIG. 8 shows a relative angular position of the rotor 20 and stator 22 during which phase 1, namely that phase during which the winding assembly W1 (that composed of the series connection of the three windings 40 illustrated in FIG. 8), is energised.)

Figure 10:
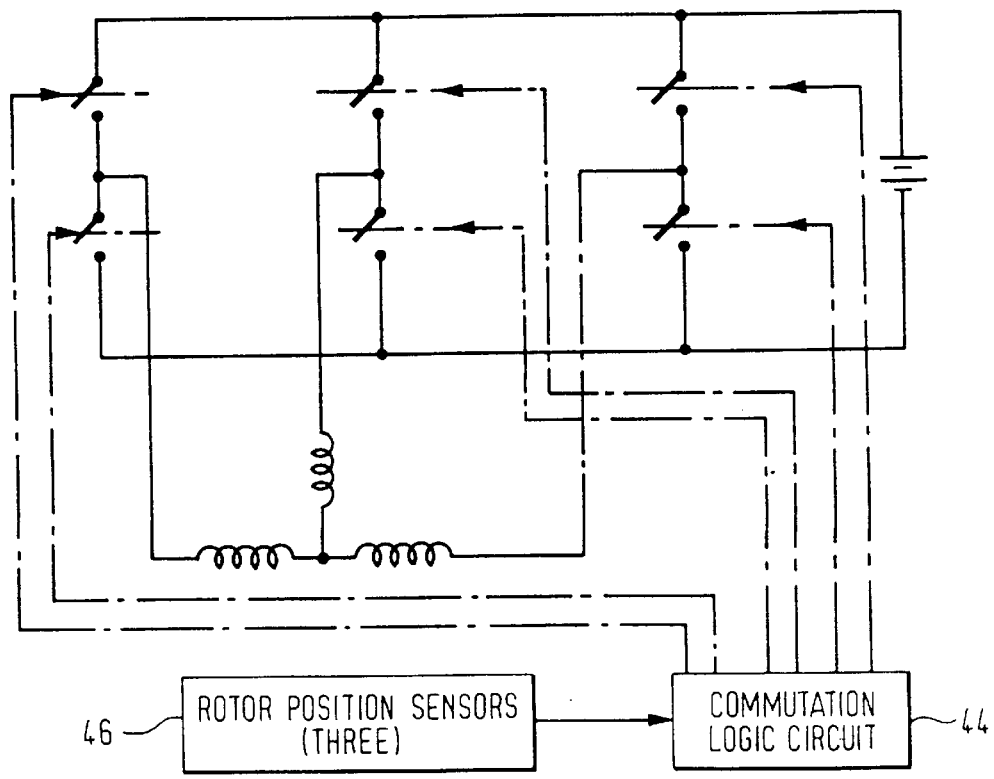
FIG. 10 is a schematic circuit diagram of a known form of switching circuit that can be used for energising the windings of a known three phase brushless DC motor.

Advantages of the use of a four phase brushless DC motor will now be described with reference to FIG. 10, which is a schematic circuit diagram (of similar form to FIG. 9) of a known form of switching circuit that can be used for energising the windings of a known three phase brushless DC motor. In FIG. 10 there are, of course, three winding assemblies, one for each of the three phases. The three winding assemblies are controlled by six semiconductor switches. Three rotor position sensors 46 are needed. The four phase circuit of FIG. 9 is less efficient than the three phase circuit of FIG. 10 to the extent that the latter uses copper more efficiently. That is, whereas in the four phase circuit of FIG. 9 each winding assembly is energised for only 25% of a cycle (revolution), in the three phase circuit of FIG. 10 each winding assembly is energised for ⅔ of a cycle. However, the four phase circuit of FIG. 9 is more efficient than the three phase circuit of FIG. 10 to the extent that the latter uses silicon less efficiently: it needs six (as opposed to four) semiconductor switches. Since silicon (in the form of semiconductor devices) is more expensive that copper, on balance the four phase arrangement is commercially superior. Further, the four phase circuit of FIG. 9 is technically superior to the three phase circuit of FIG. 10 in the following two respects. First, all of the switches of the four phase circuit of FIG. 9 (unlike those of the three phase circuit of FIG. 10) are connected to a common circuit node, which leads to lower complexity of the drive circuitry for energising the windings. Second, in the four phase circuit of FIG. 9, short circuit failure of any one of the switches S1 to S4 will leave an inductance (one of the winding assemblies) across the DC supply. The same does not apply to the three phase circuit of FIG. 10.

A problem with the arrangement embodying the invention as described above, i.e. an arrangement in which each phase is wound on a respective one of the sets of main teeth Tm, occurs when each phase winding is turned off. At this instant, the stored magnetic energy due to the winding current forces the turn off voltage of the associated one of the switches S1 to S4 to increase until the switch conducts due to avalanche or Zener effects. With the correct selection of switching device, this mode of conduction can be sustained without device failure. However, the resultant power loss will make the motor and the energisation (drive) arrangement inefficient.

This problem may be overcome, at least partially, by mutual coupling of the winding assemblies, which may be achieved by arranging the windings 40 making up the winding assembly of each phase so that they are, wound around teeth of alternate ones (opposed pairs) of the sets of main teeth Tm (instead of around the teeth of one set only of the main teeth). In this regard, there is a 180° phase shift between the NITC waveforms of phases 1 and 3. Similarly, there is a 180° phase shift between the NITC waveforms of phases 2 and 4. Thus, by rearranging the windings 40 so that the windings in each set of main teeth Tm include half the windings of one phase (e.g. phase 1) and half the windings of the opposed phase (e.g. phase 3), a mutual flux coupling is achieved between the opposed phases, which enables the effects of the above-mentioned problem to be reduced or even substantially eliminated. (The coupling can, if desired, be further enhanced by winding both opposed phase pairs at the same time, thus distributing the conductors evenly across the slots between the teeth.)

FIG. 11 is a view of a drive circuit, modified with respect to that of FIG. 9, which enables the above effect to be achieved. In the case of FIG. 11, both the winding assembly W1 for phase 1 and the winding assembly for phase 3 are wound around both of one alternate (diametrically opposed) pair of sets of main teeth Tm, whereby the winding assemblies for phases 1 and 3 are mutually coupled. Likewise, both the winding assembly W2 for phase 2 and the winding assembly for phase 4 are wound around both of the other alternate (diametrically opposed) pair of the sets of main teeth Tm, whereby the winding assemblies for phases 2 and 4 are mutually coupled. In FIG. 11, clamping diodes D1 to D4 are connected across the switches S1 to S4, respectively.

The operation of the arrangement of FIG. 11 will now be described. When phase 1 (for example) is turned off by opening the switch S1, the voltage (positive) that was induced in the winding assembly W1 for phase 1 is complemented by a negative voltage (with respect to the supply voltage) induced, by virtue of the mutual coupling, in phase 3. By virtue of the clamping diode, the stored magnetic energy is safely removed. The same effect is achieved, via the clamping diodes D4, D1 and D2, when phases 2, 3 and 4 (respectively) are turned off. As a result, with the above configuration, a four phase motor and drive arrangement which deals with stored energy substantially as efficiently as the three phase arrangement of FIG. 10 can be achieved.

One way in which the above described mutual coupling of the phase windings can be achieved will now be described with reference to FIGS. 12 to 14. FIG. 12 shows the stator 22 from an insertion side or end, at which emerge the ends φ1C to φ4C (see FIG. 11) of the winding assemblies W1 to W4 that are connected to the switches S1 to S4, respectively. FIG. 13 shows the stator 22 from the opposite side or end, at which emerge the ends φ1S to φ4S (see FIG. 11) of the winding assemblies W1 to W4 that are connected in common. FIG. 14A shows the stator 22, from the insertion side, prior to winding, and FIGS. 14B and 14C are tables showing how winding is carried out, the numbers in the tables corresponding to the numbering in FIG. 14A of the slots (1 to 16) between the teeth Tm and Ta.

Considering for example phase 1, this is wound in accordance with FIG. 14B. Thus, it starts (φ1C) in slot 2, at the insertion side, emerges from slot 1, goes back to slot 2, emerges from slot 3, goes to slot 4, and then emerges from slot 3 at the insertion side. (So far, phase 1 has been wound around the set of main teeth at the top in FIG. 14). Then, the winding is directed (at the insertion side) around the periphery of the stator 22 to the slot 9, namely to the set of main teeth Tm that alternates with (is diametrically opposite to) the set at which winding started. It then goes via the slots 9, 10, 11, 10, 11 and 12 and ends (φ1S) at slot 12 at the side of the stator 22 opposite to the insertion side.

Phase 3 is wound via the same route as phase 1 (see FIG. 14B) except that it starts (φ3S) at the side opposite to the insertion side and ends (φ3C) at the insertion side.

As will be evident from FIGS. 12, 13 and 14C, phases 2 and 4 are wound in a manner similar to phases 1 and 3, except that in this case they are wound around the sets of main teeth Tm on the left and right in FIG. 14A, that is the other two alternate (diametrically opposed) sets.

In a preferred arrangement, each phase winding has eight filars and is wound five times around each relevant main tooth Tm.

The mutual coupling of the winding assemblies as just described was presented in the context of an improvement to the four phase brushless DC motor embodying the invention as described prior to that. It should however be noted that the mutual coupling feature and the advantage thereof has more general applicability to four phase brushless DC motors, for example to the known unequal arc arrangement as described above with reference to FIGS. 1 and 2, whether implemented as a radial type rotary motor (as in FIGS. 1 and 2), an axial type rotary motor or a linear motor. Thus, for example, winding and energisation would be carried out as described above with reference co FIGS. 11 to 14C, save that the winding would be carried out on, for example, the teeth 14 of the motor described above with reference to FIGS. 1 and 2. The teeth in this case can be considered as being arranged in a number of sets (not separated by auxiliary teeth), the number of sets being an integral multiple of four (e.g. 4, 8, 12 etc) and each set comprising at least one tooth. The mutual coupling is achieved, as described above with reference to FIGS. 11 to 14C, by disposing both the windings 16 of the first and third phases around alternate ones of the sets of teeth 14 and both the windings 16 of the second and fourth phases around the other alternate ones of the sets of teeth 14.

The motor embodying the invention as described above is a four phase motor having three main teeth Tm per set. It is however to be noted that motors embodying the invention as described above may be modified to have other numbers of main teeth Tm per set and other numbers of phases.

Considering first the number of main teeth per set, this may be one or any plural number other than three. For instance, the four phase motor as described above could be modified to have one main tooth per set, in which case the motor would have four main teeth Tm, four auxiliary teeth Ta and six magnets M. (In this case, the tooth angle β for the four main teeth Tm (which it will be recalled is substantially equal to the pole angle α for the magnets M) would be (360°/6)=60° and the tooth angle γ for the four auxiliary teeth Ta would be half that, namely (360°/6/2)=30°.

The number of phases may be other than four. If so, the relationship between the tooth angle γ (tooth arc TAa) of the auxiliary teeth Ta and the pole angle α (pole arc PA) will be other than 1:2. For a three phase motor, for example, the relationship γ=2α/3 applies. More generally, for an n-phase motor, the relationship γ=2α/n applies.

Although in the above-described arrangement the number (four) of sets of main teeth Tm is equal to the number of phases, the number of sets of main teeth may be greater than the number of phases. The number of sets of main teeth should be both an integral multiple of two (i.e. it should be an even number) and an integral multiple of the number of phases. Thus, for a four phase motor, the number of sets of main teeth may be 4 (as described above, and as is preferred), 8, 12, 16 and so on. For a three phase motor, the number of sets of main teeth may be 6 (preferred), 12, 18 and so on.

As indicated briefly above, the provision in the above-described motor of the auxiliary (non-wound) teeth Ta need not give rise to a loss in efficiency because the space around the teeth can be used to accommodate the windings of the main teeth Tm. This can be done by offsetting the uprights of the Ts of some of the teeth Tm from centre so as to equalise the areas available for accommodating the windings.

FIG. 15 shows how this can be done. FIG. 15 is a schematic view of a linear development of part of the stator 22, modified to provide better accommodation for the windings. In FIG. 15, a part of the stator 22 comprising one of the sets of three main teeth Tm is shown. As can be seen, the uprights of the Ts of the two outer main teeth Tm are offset from centre in respective opposite directions. The extent of the offset is such that the areas (2A) of the two spaces or slots between the uprights of the Ts of the three main teeth Tm are at least approximately equal to twice the areas (A) of the two spaces or slots between the uprights of the Ts of the outer two main teeth Tm and the uprights of the Ts of the two auxiliary teeth Ta adjacent same.

Figure 1:
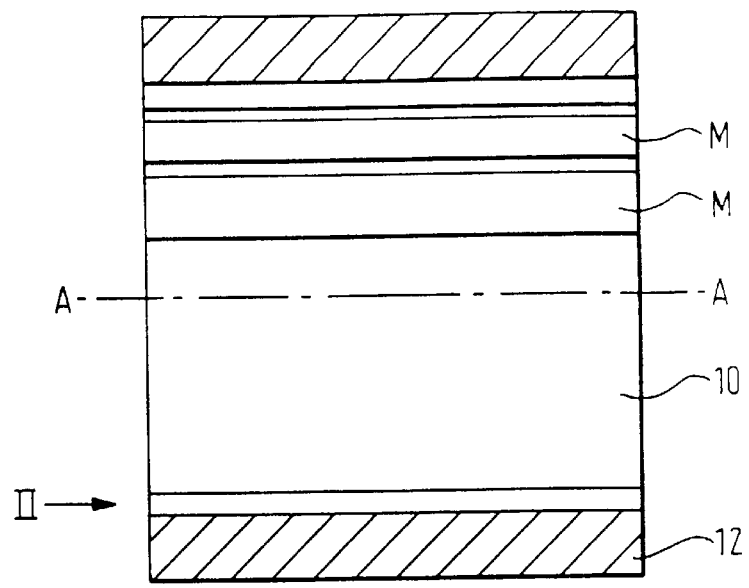
FIG. 1 is a somewhat schematic side view of a known brushless DC motor with a stator thereof represented in cross section.
Figure 2:
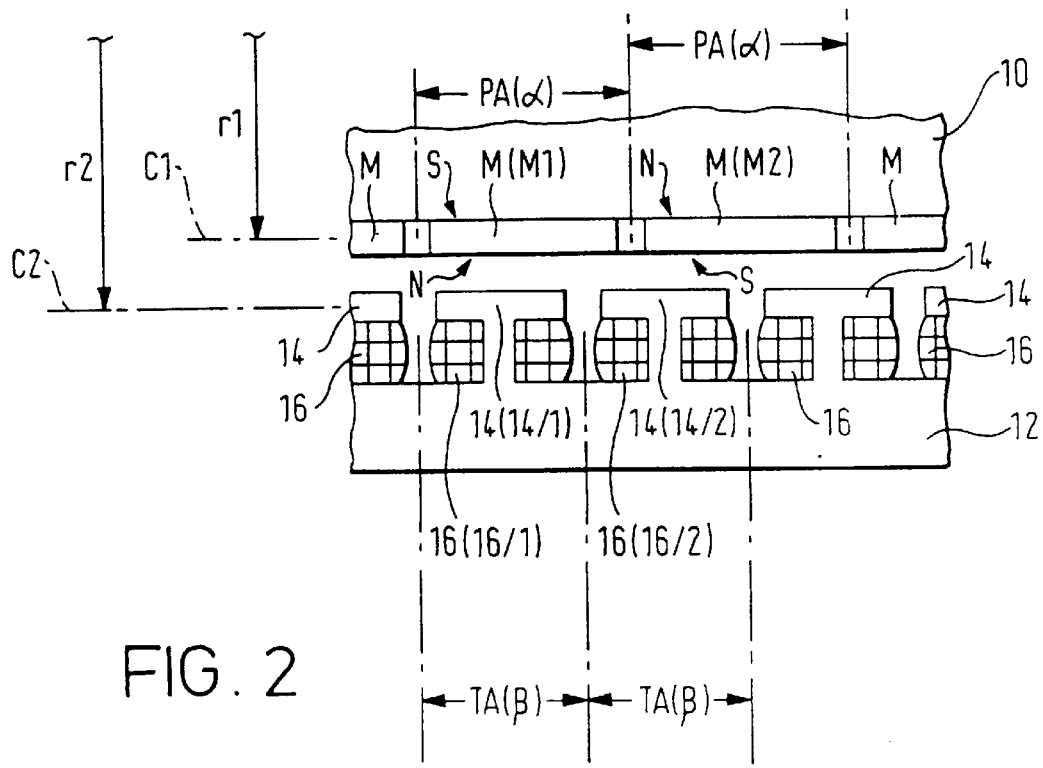
FIG. 2 is a linear development of a partial end view of the motor of FIG. 1 taken along the direction of an arrow II in FIG. 1.

The motors embodying the invention as described hereinabove are, like the known motor of FIGS. 1 and 2, radial type rotary motors. However, the invention is not restricted to implementation in this form. The invention may be embodied so as to provide, for example, an axial type rotary motor or a linear motor.

A modification of the radial type rotary motor described above, which is in the form of an axial type rotary motor, will now be described with reference to FIGS. 16 to 18. The motor of FIGS. 16 to 18 is, except that it is of the axial type, of substantially the same construction as the radial type motor described with reference to FIGS. 5 to 8. Accordingly, the motor of FIGS. 16 to 18 will be described only in so far as it differs from that of FIGS. 5 to 8. Also, items in FIGS. 16 to 18 corresponding to items in FIGS. 5 to 8 are identified by the same reference signs as in FIGS. 5 to 8, but with prime superscripts.

The motor of FIGS. 16 to 18 comprises a rotor 20' (FIG. 16) comprising a disc-like mild steel body 24'. In this case, the fourteen magnets M' are adhesively secured to one (flat) face of the disc-like body. The magnets M' are wedge-shaped and extend radically of the centre of the body 24', the centre being disposed on the axis A'—A' (FIG. 18) of rotation of the motor. As in the case of the magnets M of the motor of FIGS. 5 to 8, there are fourteen like magnets M' equally spaced around the axis A'—A' each occupying part of (and preferably substantially the whole of) a respective pole arc which subtends to the axis A'—A' a pole angle α equal to (360"/14)=25.71°.

The stator 22' of the motor of FIGS. 16 to 18 has twelve main teeth Tm' and four auxiliary teeth Ta' which are similar to the teeth of the stator 22 of the motor of FIGS. 5 to 8, except that they are provided at one (flat) face of a disc. The teeth Tm' and Ta' extend radially of the centre of the disc, the centre being disposed on the axis A'—A'. The teeth Tm' and Ta' are spaced and relatively sized similarly to the teeth of the motor of FIGS. 5 to 8. i.e. so that each main tooth Tm' occupies part of (and preferably substantially the whole of) a respective tooth arc which subtends to the axis A'—A' a common tooth angle β equal to (360°/14)=25.71°, and so that each auxiliary tooth Ta' occupies part of (and preferably substantially the whole of) a respective tooth arc which subtends to the axis A'—A' a common tooth angle γ equal to (360°/14/2)=12.86°.

As can be seen from FIG. 18, both the main teeth Tm' and the auxiliary teeth Ta' are preferably substantially T-shaped with the uprights of the Ts extending radially of the axis A'—A' and with the cross bars of the Ts facing the permanent magnets M' across a disc-like air gap formed when, upon construction of the motor, the rotor 20' and the stator 22' are mounted so that their centres are coaxial with the axis A'—A' and so that the flat faces thereof are opposed to one another so that the magnets M' face the teeth Tm', Ta' with the air gap therebetween.

Windings 40' are wound around the main teeth Tm'.

The axial type motor of FIGS. 16 and 18 is energised and operates in a manner which is exactly analogous to the radial type motor of FIGS. 5 to 8.

It was explained above that the pole arcs PA of the magnets M of the radial type motor of FIGS. 5 to 8 differ very slightly from the tooth arcs TA of the main teeth Tm. This is because the pole arcs PA are measured along a first circle (passing through the magnets M) centred on the axis A—A and the tooth arcs TA are measured along a second circle (passing through the teeth) centred on the axis A—A.

So, for α=β, the values of PA and TA must differ slightly because the first and second circles are on opposite sides of the (cylindrical) air gap. However, in the axial type motor of FIGS. 16 to 18, the pole arcs and tooth arcs can be considered to be arcs of any common circle located in the (disc-like) air gap between the magnets M' and the teeth Tm', Ta', so that in this case, for α=β, the tooth arcs and pole arcs are exactly the same.

In the radial type motor of FIGS. 5 to 8, the rotor 20 can be considered to move relative to the stator 22 along a predetermined path defined by a circle centred on the axis A—A and located in the cylindrical air gap. Thus, the pole arcs PA can be considered to be respective sections (pole sections) of that path, i.e. respective sections of the circumference of that circle each equal to 1/14 of the circumference. Likewise, the main tooth arcs TA can be considered to be respective sections (tooth sections) of that path, i.e. respective sections of the circumference of that circle each equal to 1/14 of the circumference; and the auxiliary tooth arcs TAa can be considered to be sections of that circumference each equal to 1/28 thereof.

Likewise, in the axial type motor of FIGS. 16 to 18, the pole arcs and the main and auxiliary tooth arcs can be considered to be like sections of the circumference of a predetermined path of travel of the rotor 20' relative to the stator 22', that path being defined by any circle centred on the axis A'—A' and located in the disc-like air gap between the magnets M' and the teeth Tm', Ta'.

The invention is not limited to implementation as a rotary motor. It may also be embodied in the form of a linear motor. How the motor may be implemented is this form can readily be comprehended by imagining the radial type rotary motor as shown in FIG. 8 split at a position around its periphery and the cylindrical rotor 20 and stator 22 then being "unrolled" into a flat form. That is to say, such a linear motor can be considered to be a real (rather than a notional) linear development of the motor of FIGS. 5 to 8, with the rotor (rotary movable element) becoming a translational movor which is movable element translationally with respect to the stator.

Part of such a linear motor is shown somewhat schematically in FIG. 19, where items corresponding to items in FIGS. 5 to 8 are identified by the same reference signs as in FIGS. 5 to 8, but with double prime superscripts.

In this case, the movable element 20" moves relative to the stator 22" along a predetermined path defined by a straight line extending, in the plane of FIG. 19, along the (web-like) air gap between the movable element and the stator, the magnets M" and teeth Tm", Ta" being arranged linearly along opposite sides of the path.

In the rotary type motors embodying the invention as described above, the rotor and stator are capable of unlimited relative angular movement. The invention is, however, also applicable to motors in which relative angular movement of the stator and rotor is limited.

I claim:

1. A brushless DC motor comprising:
   a movable element and a stator having confronting surfaces, the movable element being movable relative to the stator along a predetermined path;
   a plurality of permanent magnets provided at one of said confronting surfaces, the magnets being equally spaced along said path such that each said magnet occupies part of a respective pole section of said path, said pole sections being equal to one another;
   a plurality of teeth provided at the other of said confronting surfaces, said teeth being spaced from one another along said path such that each said tooth occupies part of a respective tooth section of said path, said tooth sections being equal to one another; and
   windings wound around said teeth whereby energisation of the windings with electrical currents at respective phases will produce a torque that will move the movable element;
   said tooth sections being substantially equal to said pole sections;
   said teeth being arranged in an even number of sets, each set comprising at least one said tooth; and
   the sets of tooth sections occupied by said sets of teeth being arranged such that: (i) they are spaced apart by an extent, measured along said path, substantially equal to twice said pole section divided by the number of phases, and (ii) the position of a magnet interface relative to a tooth in one set of teeth is not the same as the position of a magnet interface to a tooth in another of said sets of teeth.

2. A brushless DC motor according to claim 1, wherein a respective further tooth, not having a winding thereon, is disposed in each space between said sets of tooth sections occupied by said sets of teeth.

3. A brushless DC motor according to claim 2, wherein both said teeth having said windings thereon and said further teeth are substantially T-shaped with the cross bars of the Ts facing the permanent magnets.

4. A brushless DC motor according to claim 1, wherein the number of said sets of teeth is an integral multiple of four and the motor is a four phase motor.

5. A brushless DC motor according to claim 4, wherein each said tooth set comprises three teeth.

6. A brushless DC motor according to claim 4, wherein the windings of first and third of the phases are mutually coupled and the windings of second and fourth of the phases are mutually coupled.

7. A brushless DC motor according to claim 6, wherein the mutual coupling of the windings of the first and third phases is achieved by disposing both the windings of the first and third phases around alternate ones of said sets of teeth and the mutual coupling of the windings of the second and fourth phases is achieved by disposing both the windings of the second and fourth phases around the other alternate ones of said sets of teeth.

8. A brushless DC motor according to claim 1, wherein the plurality of permanent magnets is provided at said confronting surface of the movable element and the teeth are provided at said confronting surface of the stator.

9. A brushless DC motor according to claim 1, which is a radial type rotary motor, the movable element being a rotor, and wherein one of the rotor and stator is generally cylindrical and nested within the other, said magnets and said teeth are both elongate and extend parallel to an axis of rotation of the rotor, and said path is defined by a circle which is centred on the axis of rotation and located in a cylindrical air gap between the rotor and the stator.

10. A brushless DC motor according to claim 9, wherein the rotor is arranged outside of the stator.

11. A brushless DC motor according to claim 10, wherein the rotor comprises a cylindrical body having the permanent magnets mounted to the inside thereof.

12. A brushless DC motor according to claim 1, which is an axial type rotary motor, the movable element being a rotor, and wherein the rotor and stator have opposed faces, said magnets are arranged on one of said opposed faces and said teeth are arranged on the other of said opposed faces, and said path is defined by a circle which is centred on an axis of rotation of the rotor and located between the magnets and teeth in a disc-like air gap between the rotor and the stator.

13. A brushless DC motor according to claim 1, which is a linear motor, the movable element being translationally movable, and wherein said magnets and teeth are arranged linearly along opposite sides of a straight line, defining said path, located between the magnets and the teeth.

14. A brushless DC motor according to claim 1, wherein a respective further tooth, not having a winding thereon, is disposed in each space between said sets of tooth sections occupied by said sets of teeth, and both said teeth having said windings thereon and said further teeth are substantially T-shaped with cross bars of the Ts facing the permanent magnets, and uprights of the T-shaped outer teeth of each set are offset from centre in respective opposite directions.

15. A brushless DC motor comprising:

a movable element and a stator having confronting surfaces, the movable element being movable relative to the stator along a predetermined path;

a plurality of permanent magnets provided at one of said confronting surfaces and spaced along said path;

a plurality of teeth provided at the other of said confronting surfaces and spaced along said path; and windings wound around said teeth whereby energisation of the windings with electrical currents at four respective phases will produce a torque that will move the movable element;

said teeth being arranged in a number of sets, the number of sets being an integral multiple of four and each set comprising at least one said tooth; and the windings of first and third of the phases being mutually coupled and the windings of second and fourth of the phases being mutually coupled, whereby the windings of any particular set of teeth comprise windings for both the first and third phases or windings for both the second and fourth phases.

16. A brushless DC motor according to claim 15, wherein the mutual coupling of the windings of the first and third phases is achieved by disposing both the windings of the first and third phases around alternate ones of said sets of teeth and the mutual coupling of the windings of the second and fourth phases is achieved by disposing both the windings of the second and fourth phases around the other alternate ones of said sets of teeth.

* * * * *